No. 708,358. Patented Sept. 2, 1902.
A. HONRATH.
MECHANICAL TOY.
(Application filed May 19, 1902.)
(No Model.)
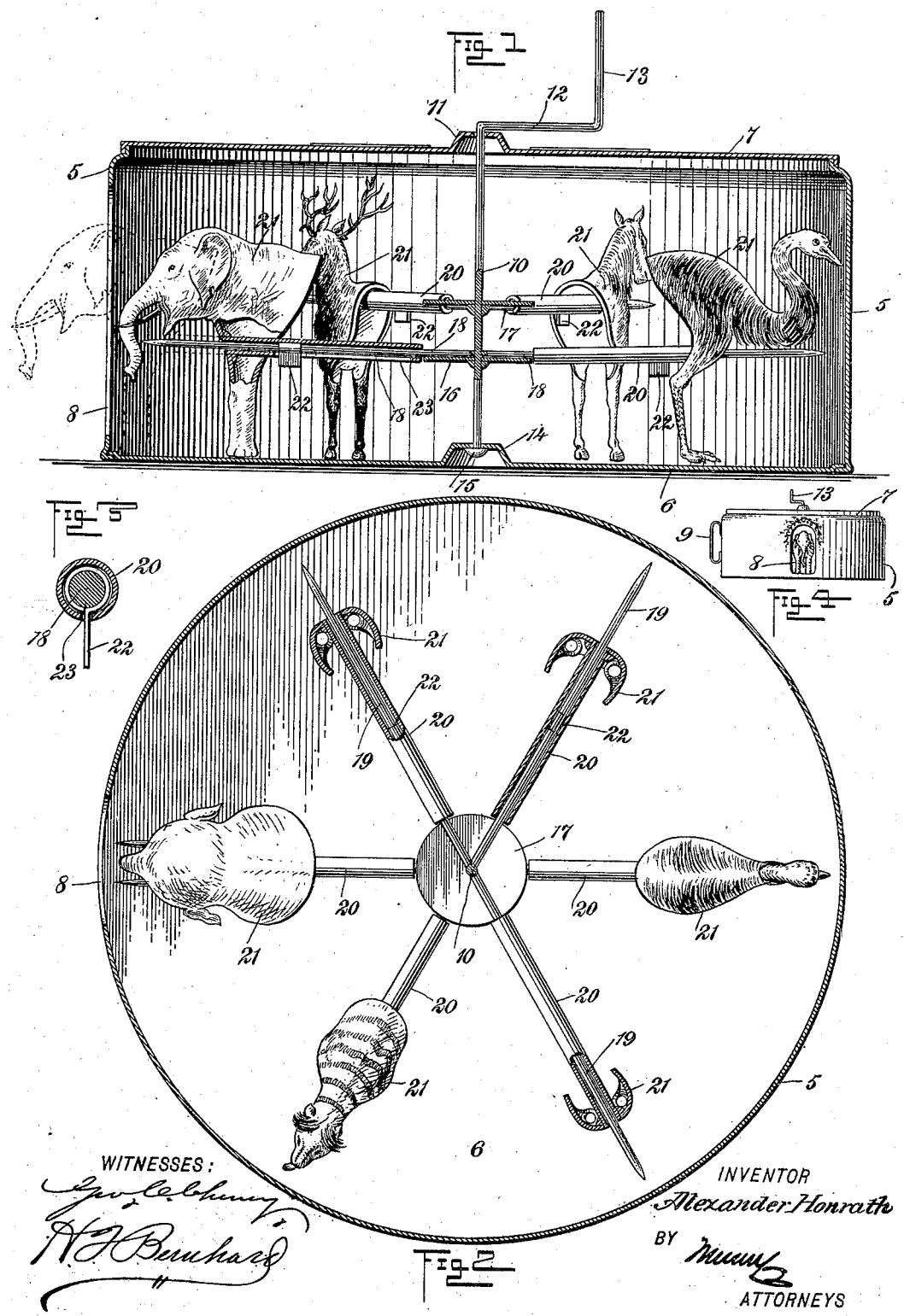
WITNESSES:
INVENTOR
Alexander Honrath
BY
ATTORNEYS

UNITED STATES PATENT OFFICE.

ALEXANDER HONRATH, OF REYNOLDS, INDIAN TERRITORY.

MECHANICAL TOY.

SPECIFICATION forming part of Letters Patent No. 708,358, dated September 2, 1902.

Application filed May 19, 1902. Serial No. 107,991. (No model.)

*To all whom it may concern:*

Be it known that I, ALEXANDER HONRATH, a citizen of the United States, and a resident of Reynolds, in the Choctaw Nation, Indian Territory, have invented new and useful Improvements in Mechanical Toys, of which the following is a full, clear, and exact description.

My invention relates to improvements in mechanical toys; and the object that I have in view is the provision of a simple and cheap toy designed especially to attract the attention of and to afford instructive amusement to children in their play, said article embodying in its construction a number of objects, such as animals or the like, which may be brought to view in an arbitrary manner, although the objects are prevented from being withdrawn wholly from the casing.
With these ends in view the invention consists in the construction and arrangement of parts which will be hereinafter fully described and claimed.

Reference is to be had to the accompanying drawings, forming a part of this specification, in which similar characters of reference indicate corresponding parts in all the figures.

Figure 1 is a vertical sectional elevation through a mechanical toy embodying my invention. Fig. 2 is a sectional plan view illustrating the radial movable objects in their retracted positions, so that the carrier or spiders may rotate freely within the casing. Fig. 3 is a transverse section through one of the spider-arms and the sleeve which is slidable thereon, illustrating the arrangement of the stop to limit the slidable movements of said sleeve and the object carried thereby; and Fig. 4 is an elevation on a greatly-reduced scale looking at that side of the casing in which is provided the doorway through which the objects are adapted to be projected.

In carrying my invention into practice I provide a casing of any suitable material, size, and shape; but, as shown by the drawings, the casing 5 is made of metal in circular form and provided with a bottom 6 and a top 7. One of the parts, either the bottom or the top, may be integral with the shell 5;
but I prefer to make the bottom 6 in a separate piece and to fasten it to the shell or casing 5 in any suitable way. This casing is provided with a door or gateway 8, which may be of any fanciful form, as shown by Fig. 4, and of suitable dimensions in order that the objects may be extended or projected therethrough, and, if desired, said casing may be provided with a handle, as indicated at 9 in Fig. 4, although this handle may be omitted.

10 designates a vertical shaft which is mounted centrally in the casing. The upper portion of this shaft passes through an opening which is provided in the boss 11, the latter being formed on the top 7 and extending a suitable distance above the same. The upper part of said shaft 10 is provided with a suitable crank 12, having a handle 13, and this crank is kept in spaced relation to the top 7 of the casing by the provision of the boss 11, thus preventing the crank from rubbing frictionally against the casing. The lower part of the shaft 10 passes through and is journaled in a step 14, which is raised up from or otherwise provided on the bottom 6, and said lower extremity of the shaft has a footpiece 15, which is housed within the cavity of said step 14, as shown by Fig. 1, said footpiece preventing the shaft from being raised through the casing and from being pulled out of place. This shaft is equipped with a rotary carrier adapted to sustain the series of radially-movable objects, and in the embodiment of the invention shown by the drawings this carrier consists of one or more hubs 16 17 and one or more series of radial arms 18 19. The series of radial arms 18 are fastened in a suitable way to the hub 16, so that all the arms of the series will lie in the same transverse plane. The arms 19 of the other series are similarly fastened and arranged with respect to the hub 17, and the arms of the two series forming the spiders of the revoluble carrier are so disposed relatively to each other that they will lie in different horizontal planes. A plurality of slidable sleeves 20 are fitted loosely on the arms 18 19 of the two series, and these sleeves are equipped with the objects 21, which may represent a horse, a stag, an elephant, an ostrich, or any other animal, or an object of any suitable nature. These objects may be made of sheet metal, papier-mâché, or any other suitable material, and they may be fastened to the sleeves, so as to be projected through the doorway or gateway 8 in the casing. The sleeves are fitted snugly on the arms of the spiders, and they are kept from turning thereon and limited in their radial movement by the employment of the stops 22. Each stop is made fast with one arm of the spider, and said stop projects through a longitudinal slot 23, which is formed in the lower or under side of each sleeve 20. The inner end of the slot is closed, so as to form a shoulder adapted to strike against the stop on the outward movement of the sleeve and the object, thereby arresting said outward movement of the object; but the inward slidable movement of the sleeve and the object may be arrested by the sleeve coming against one of the hubs or by the outer closed end of the slotted sleeve striking against the stop 22.

In using the toy the crank 13 is turned in order to impart rotary motion to the shaft 10 and the revoluble carrier, and the objects are thus given a rotary motion within the casing, so that they will not be visible by the user of the toy. When the carrier and the objects thereon come to a period of rest, one of the spider-arms and the object thereon will be opposite or adjacent to the door or gateway 8, and the toy may now be tilted in a direction to make the sleeve and the object slide on the spider-arm, thus projecting the object through the door or gateway 8. The object is thereafter restored into the casing by pushing it therein or by tilting the casing the other way, and the crank may again be turned so as to repeat the operation.

It will be understood that the arms of the spiders terminate a suitable distance from the casing in order that the spiders and the objects thereon may rotate freely within the casing. If desired, the stops 22 may be fastened to the arms at different distances from the casing or from the shaft, and the objects may thus slide for different distances on the spider-arms, thus allowing certain objects to project farther beyond the casing than other objects.

The top of the casing may be provided with a suitable dial adapted to be traversed by the handle or crank and to serve as a means for indicating the points at which the handle should be stopped in order that the objects may be projected through the doorway in the casing.

If desired, the sleeves may each be provided at the inner end with a staple adapted to slide beneath the hub, and thus allow a more extended movement of the sleeve and the object carried thereby.

Having thus described my invention, I claim as new and desire to secure by Letters Patent—

1. A mechanical toy, comprising a suitable casing having a doorway, a revoluble carrier within said casing, a series of objects, and means for slidably mounting said objects on said carrier.

2. A mechanical toy comprising a suitable casing, a carrier revolubly mounted therein and having radial arms, a series of objects, and means carrying said objects and fitted to the carrier to rotate therewith within the casing and capable of slidable movement on the arms of said carrier.

3. A mechanical toy comprising a suitable casing, a revoluble carrier having radial guides, objects having supporting means slidably mounted on the guides of the carrier, and means for limiting the radial movements of the objects with respect to the carrier.

4. A mechanical toy, comprising a suitable casing having a doorway, a rotary carrier provided with two series of radial arms, stops on said arms at different distances from the axis of rotation of the carrier, and objects having supporting means slidably mounted on said arms and limited in their radial movements by the stops.

5. A mechanical toy, comprising a suitable casing having a doorway, a revoluble carrier within said casing and provided with arms, slotted sleeves slidably fitted to arms of the carrier, stops passing through said slots of the sleeve and restraining the sleeves from axial displacement on said carrier, and means for rotating said carrier.

In testimony whereof I have signed my name to this specification in the presence of two subscribing witnesses.

ALEXANDER HONRATH.

Witnesses:
H. F. BERNHARD,
EVERARD BOLTON MARSHALL.